H. M. WHITEHEAD.
Whiffletree.
No. 225,250.  Patented Mar. 9, 1880.
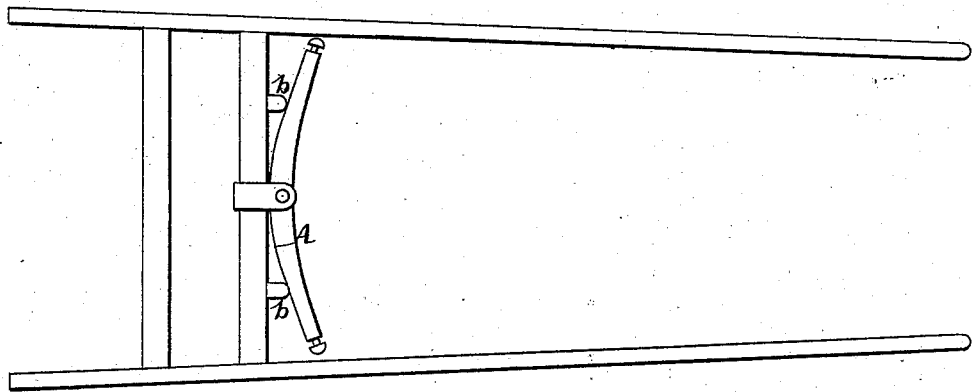
Witnesses.  Inventor.

UNITED STATES PATENT OFFICE.

HENRY M. WHITEHEAD, OF NEW YORK, N. Y.

WHIFFLETREE.

SPECIFICATION forming part of Letters Patent No. 225,250, dated March 9, 1880.

Application filed January 10, 1880.

*To all whom it may concern:*

Be it known that I, HENRY M. WHITEHEAD, of the city, county, and State of New York, have invented a new and useful Improvement in Whiffletrees, of which the following, taken in connection with the accompanying drawing, is a full, clear, and accurate description.

My invention consists of an elastic whiffletree, in combination with stops applied to bear against the back face of the elastic whiffletree, as hereinafter more fully set forth, and pointed out in the claim.

In the drawing the figure represents my improvement connected with the shafts of a vehicle.

I take a single bar, A, of highly-tempered steel, or of steel and wood combined in a single bar, or a single bar of other elastic material, and attach the same by any suitable means to the cross-bar which connects and separates the shafts of the vehicle. To this bar the traces are attached, as to an ordinary whiffletree.

The stops are either made non-elastic, or, if desired, can be formed of rubber or other elastic material, and thus give additional elasticity to the spring or bar A. The stops $b\ b$, instead of being placed on the cross-bar, may be placed at any other convenient point, so as to cause the bar A to remain bent or arched, and the bar A, instead of being bent or arched forward, may be bent or arched backward.

The bar A, either straight or arched, forms an elastic whiffletree, which insures equable and agreeable traction with a diminished expenditure of motive power.

Having thus described my invention, what I claim, and desire to secure by Letters Patent, is—

An elastic whiffletree formed of the bar or spring A, in combination with the stops $b\ b$, placed in such a position as to bend or arch the said bar A either forward or backward, substantially as described, and for the purposes above set forth.

In testimony whereof I have hereunto set my hand this 4th day of October, 1879.

HENRY M. WHITEHEAD.

In presence of—
CHARLES G. COE,
R. T. VAN BOSKERCK.